United States Patent
Kim et al.

(10) Patent No.: US 7,035,122 B2
(45) Date of Patent: Apr. 25, 2006

(54) SWITCHING POWER SUPPLY DEVICE AND METHOD

(75) Inventors: Jung-Won Kim, Seoul (KR); Dong-Young Huh, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 28 days.

(21) Appl. No.: 10/920,816

(22) Filed: Aug. 18, 2004

(65) Prior Publication Data
US 2005/0078493 A1    Apr. 14, 2005

(30) Foreign Application Priority Data
Sep. 8, 2003    (KR) ...................... 10-2003-0062613

(51) Int. Cl.
*H02M 3/335*    (2006.01)

(52) U.S. Cl. ................................. 363/21.18; 363/21.16

(58) Field of Classification Search ............. 363/21.18, 363/21.16, 21.12
See application file for complete search history.

(56) References Cited

U.S. PATENT DOCUMENTS 6,366,481 B1 *    4/2002    Balakrishnan et al. ... 363/21.15

* cited by examiner

*Primary Examiner*—Shawn Riley
(74) *Attorney, Agent, or Firm*—Sidley Austin LLP (57) ABSTRACT

A switching power supply includes a switch, a bias-sensor to sense the switch-voltage, and a zero-crossing detector (ZCD) to sense time instances when the bias-sensor voltage crosses zero. ZCD generates a ZCD-signal, which transitions between a first and a second level at the sensed crossing instances, with a delay. ZCD-signal is coupled to a blanking circuit, generating a blank-signal and a pulse-signal, controlling the switch. The on-time of the switch can be modified by the input voltage and load. The blank-signal between on-times is adjusted to compensate for this modification, keeping the switching frequency below a predetermined limit and reducing the switching frequency. The switching power supply further includes a pulse width modulation (PWM) signal generator, coupled to the blanking circuit and to the switch. PWM signal generator turns on the switch controlled by the pulse-signal of the blanking circuit. Blanking circuit is controlled by either the on-time or a control voltage and input voltage.

26 Claims, 7 Drawing Sheets

FIG.1

Prior Art

SWITCHING POWER SUPPLY DEVICE AND METHOD

CROSS REFERENCE TO RELATED APPLICATION

This application claims priority from Korean Patent Application No. 2003-62613, filed on Sep. 8, 2003, in the Korean Intellectual Property Office, the entire content of which is incorporated herein by reference.

BACKGROUND

1. Field of Invention

The present invention relates to a switching power supply. More specifically, the present invention relates to a switching power supply with restricted switching frequency.

2. Description of Related Art

Figure 1:
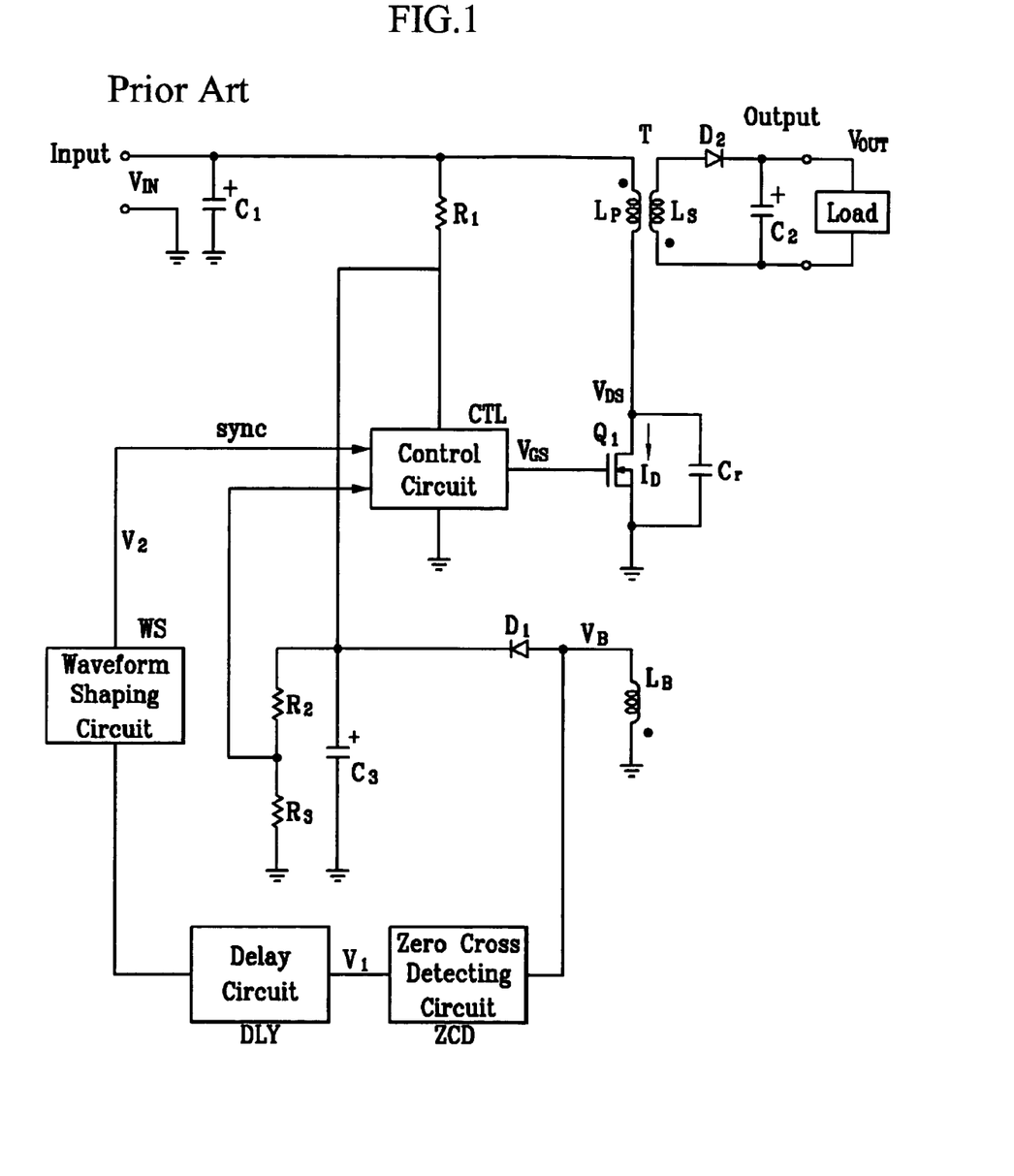
FIG. 1 shows a conventional quasi-resonant flyback converter.

FIG. 1 illustrates a quasi-resonant fly-back converter, capable of reducing switching loss and switching noise. The converter of FIG. 1 includes an auxiliary coil $L_B$ to measure a voltage at a switch $Q_1$, and a ZCD (zero-crossing detector) circuit to identify the instance when bias-coil voltage $V_B$ of bias coil $L_B$ crosses zero. A function of ZCD is to turn on switch $Q_1$ at this instance, thereby reducing switching loss.

FIGS. 2A–G show voltages and currents at the indicated nodes of FIG. 1. The operation of the converter will now be described with reference to FIGS. 1 and 2.

Figure 2:
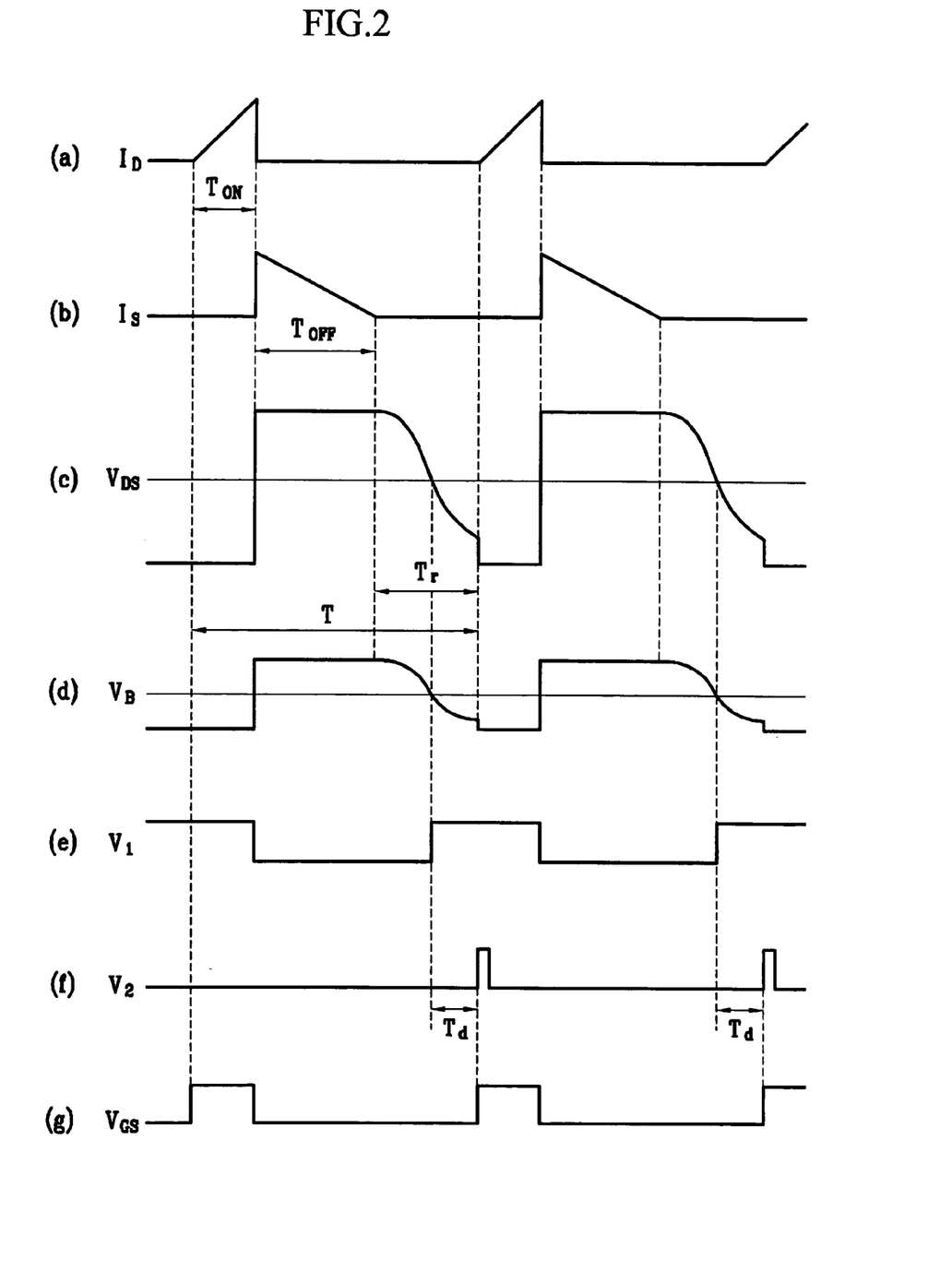
FIG. 2 shows waveforms at respective points of the converter of FIG. 1.

FIG. 2F illustrates that control circuit CTL turns on switch $Q_1$ by applying a pulse in pulse-signal $V_2$.

FIG. 2G illustrates that the pulse in pulse-signal $V_2$ generates a pulse in gate-source voltage $V_{GS}$, a gate-source voltage of switch $Q_1$.

FIG. 2A illustrates that a drain current $I_D$ of switch Q1 starts increasing with a gradient of about $V_{IN}/L_P$ at the instance of the pulse. The increase of $I_D$ lasts for an on-time $T_{ON}$. During on-time $T_{ON}$ the energy of a transformer T is output from its secondary coil $L_S$, charging up a capacitor $C_2$.

FIG. 2B illustrates a current $I_S$ of diode $D_2$ in the secondary circuit, neglecting a forward voltage. At the end of on-time $T_{ON}$, current $I_S$ starts decreasing with a gradient of about $-V_{OUT}/L_S$ until it reaches about 0V. When current $I_S$ becomes 0V, diode $D_2$ is turned off and the secondary coil acquires a high impedance.

FIG. 2C illustrates that, as a result, the voltage at primary coil $L_P$ starts resonating. The resonance period is determined by values of inductance $L_P$ and capacitance $C_r$. The voltage of capacitance $C_r$ is also the drain-source voltage $V_{DS}$ of switch $Q_1$. During the resonating process voltage $V_{DS}$ is reduced according to the shown cosine curve.

The switching loss of a MOSFET is given as $0.5 \cdot (C_{OSS} + C_r) \cdot V_{DS} \cdot V_{DS} \cdot f$, where f is a switching frequency and $C_{OSS}$ is a parasitic capacitance between the drain and the source of switch $Q_1$. Accordingly, the switching loss is proportional to drain-source voltage $V_{DS}$ and switching frequency f.

One aspect of the converter circuit of FIG. 1 is to reduce drain-source voltage $V_{DS}$, thus reducing the switching loss. This is achieved by sensing, when $V_{DS}$ reaches its low values about the bottom of the resonant waveform in FIG. 2C, and turning on switch $Q_1$ at that time instance by a pulse in $V_{GS}$.

FIG. 2D illustrates bias-coil voltage $V_B$, a voltage of bias coil $L_B$.

FIG. 2E illustrates that the instance, at which $V_B$ crosses zero, is sensed by zero-crossing detection circuit ZCD. In response, ZCD outputs a ZCD signal $V_1$ to delay circuit DLY.

FIG. 2F illustrates that delay circuit DLY, with the help of Waveform Shaping circuit WS, generates the above-described pulse in pulse-signal $V_2$, and outputs it to control circuit CTL after a predetermined delay time $T_d$. In response, control circuit CTL turns on switch $Q_1$.

The period of the converter circuit of FIG. 1 is given by $T=T_{ON}+T_r+T_{OFF}$. Here, $T_r$ is the resonant period, determined by inductance $L_P$ and capacitance $C_r$. The values of $T_{ON}$ and $T_{OFF}$ depend on input voltage $V_{IN}$ and on the output load. In particular, when the output load is reduced, the period decreases, thus increasing the switching frequency. As described above, this leads to an increase of the switching loss.

Concerning related designs, U.S. Pat. No. 5,497,311 discloses a method for restricting the maximal switching frequency of quasi-resonance flyback converters by using a mono-stable multi-vibrator. This design restricts the maximum value of the switching frequency by controlling the turned-on states of switch $Q_1$ according to the states of a mono-stable multi-vibrator. However, this design is still characterized by a high switching frequency and hence reduced efficiency.

SUMMARY

Briefly and generally, a switching power supply is presented according to embodiments of the invention. The switching power supply includes a switch to switch a switch-voltage, a bias sensor to sense the switch-voltage and to generate a bias-voltage representative thereof, a zero-crossing detector, coupled to the bias sensor to sense time instances when the bias-voltage crosses zero, and to generate a zero-crossing detector (ZCD)-signal, which transitions between a first and a second level at the sensed crossing instances, the transitions of the ZCD-signal being delayed for a predetermined time interval relative to the sensed crossings instances. The switching power supply further includes a blanking circuit, coupled to the zero-crossing detector to receive the ZCD-signal from the zero-crossing detector and to generate a blanking-signal, which transitions between a first and a second level, and to generate a pulse-signal, wherein the pulse-signal can cause the turning on of the switch, for an on-time, at time instances when the ZCD-signal and blanking-signal are at their respective second levels, and the turning off of the switch for at least a blank-time, wherein the length of the blank-time is determined according to the on-time. The switching power supply further includes a pulse width modulation (PWM) signal generator, coupled to the blanking circuit and to the switch to turn on the switch, controlled by the pulse-signal of the blanking circuit, and to transmit a signal representing the on-time to the blanking circuit.

Further, a power supply method is presented according to embodiments of the invention for controlling a time for turning on/off a switch and generating an output voltage from an input voltage. The power supply method includes: (a) sensing time instances, when a bias-voltage, related to the state of the switch, crosses zero, (b) generating a zero-crossing detection (ZCD) signal, the ZCD signal transitioning between a first and a second level at the sensed zero-crossing instances, the transitions being delayed by a predetermined interval, (c) generating a blank-signal, having a first and a second levels, the blank-signal assuming the first level for a blank-time, the length of the blank-time being variable, (d) generating a pulse-signal, capable of causing the turning on of the switch at time instances when the ZCD signal and the blank-signal are at their respective second level, and (e) turning on the switch by the pulse-signal.

BRIEF DESCRIPTION OF THE DRAWINGS

The accompanying drawings, which are incorporated in and constitute a part of the specification, illustrate embodiments according to the invention.

DETAILED DESCRIPTION

Figure 3:
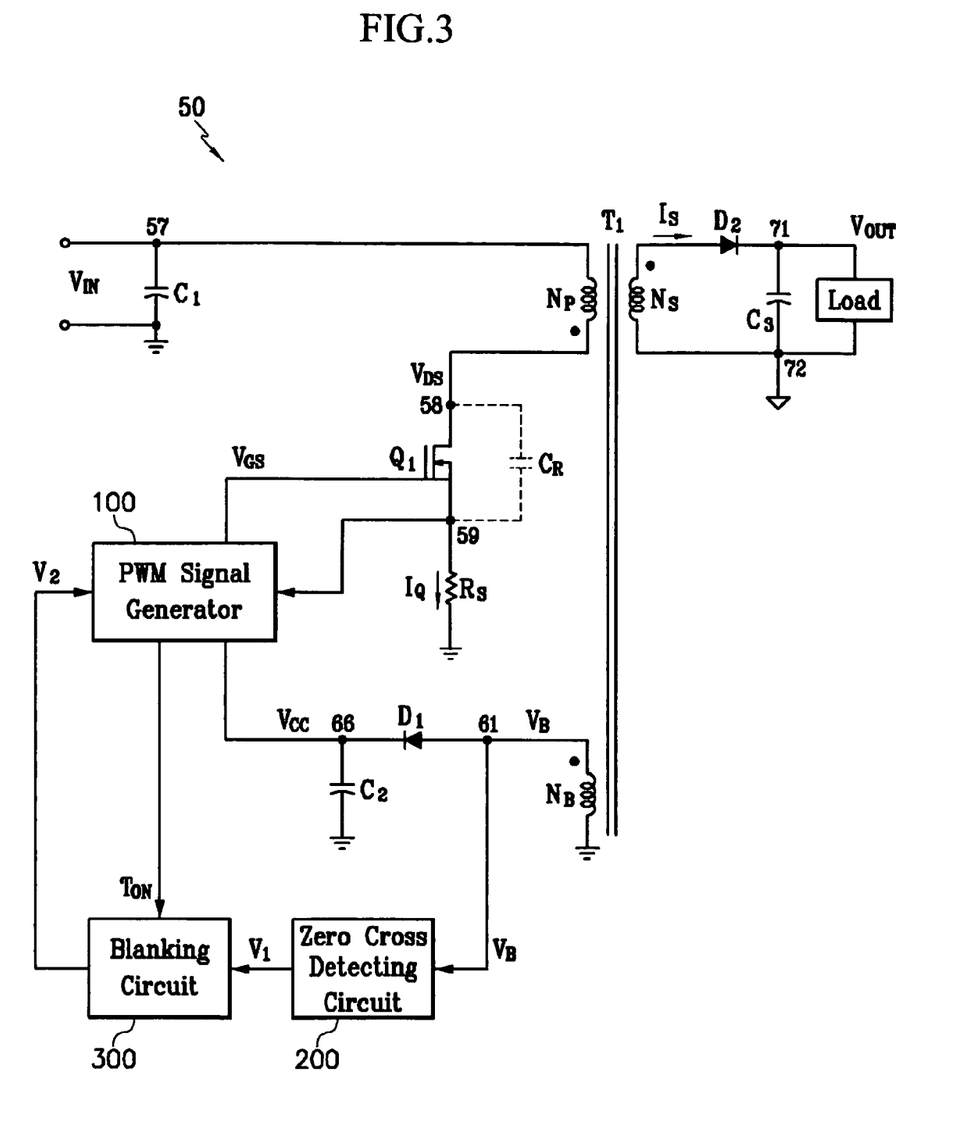
FIG. 3 shows a switching power supply according to an embodiment of the invention.

FIG. 3 illustrates a switching power supply 50 according to embodiments of the invention. Input voltage $V_{IN}$ is applied between an input node 57 and a ground. $V_{IN}$ can be an AC voltage, rectified by a capacitor $C_1$ coupled between input node 57 and the ground. A primary coil $N_P$ is coupled between input node 57 and the drain of a switch $Q_1$ at switch-drain node 58. Switch $Q_1$ can be a MOSFET or a bipolar junction transistor. The source of switch Q1 is coupled to the ground at switch-source node 59 through a resistor $R_S$. The gate of $Q_1$ is coupled to a pulse width modulator (PWM) signal generator 100. Switching power supply 50 includes a secondary coil $N_S$. Primary coil $N_P$ and secondary coil $N_S$ are wound around a shared core to form a transformer $T_1$. A bias coil $N_B$, coupled between bias-coil-node 61 and a ground, is also wound around this shared core.

Switching power supply 50 further may include a resonant capacitor $C_R$, coupled between switch-drain node 58 and switch-source node 59, in parallel to switch $Q_1$. The anode of a rectifying diode $D_1$ is coupled to bias-coil node 61, the cathode of rectifying diode $D_1$ to capacitor-node 66. A function of rectifying diode $D_1$ is to supply power to PWM signal generator 100. A capacitor $C_2$ is coupled between capacitor-node 66 and a ground. A function of capacitor $C_2$ is to smoothly rectify bias-coil voltage $V_B$ at bias-coil-node 61.

The secondary circuit includes diode $D_2$ in series, and capacitor $C_3$ in parallel with secondary coil $N_S$. The anode of diode $D_2$ is coupled to secondary coil $N_S$, the cathode of diode $D_2$ is coupled to output terminal 71. Diode $D_2$ and capacitor $C_3$ rectify the voltage generated at the secondary coil $N_S$. The output voltage $V_{OUT}$ is coupled to a load at output terminals 71 and 72, in parallel to capacitor $C_3$.

In the primary circuit zero-crossing detection circuit ZCD 200 is coupled to bias-coil-node 61. ZCD 200 generates a zero-crossing detector (ZCD) signal $V_1$, when bias-coil voltage $V_B$ of bias coil $N_B$ reaches zero volts. ZCD-signal $V_1$ from ZCD 200 is delayed by a predetermined interval $T_d$ by a delay circuit (not shown). The output signal of ZCD 200 is input to a Blanking Circuit 300.

Blanking Circuit 300 is also coupled to PWM signal generator 100, from where Blanking Circuit 300 receives a signal indicating on-time $T_{ON}$, when switch $Q_1$ is turned on. The signal, indicating on-time $T_{ON}$, can be a voltage or current signal. In response to its input signals $T_{ON}$ and $V_1$, Blanking Circuit 300 outputs pulse-signal $V_2$, coupled into PWM signal generator 100. Pulse-signal $V_2$ controls the switching frequency of switch $Q_1$. Pulse-signal $V_2$ can be related to blank-signal $V_{BLANK}$ for restricting the switching frequency of switch $Q_1$ by introducing a blank-time $T_{BLANK}$. Blank-signal $V_{BLANK}$ is generated by blanking circuit 300 internally.

The inputs of PWM signal generator 100 include pulse-signal $V_2$ of Blanking Circuit 300 and a switch-voltage $V_Q$, related to switch-current $I_Q$, flowing to the source of switch $Q_1$. PWM signal generator 100 also receives voltage $V_{CC}$ from capacitor-node 66. In response to its inputs, PWM signal generator 100 controls $V_{GS}$, the gate-source voltage of switch $Q_1$. High and low levels of gate-source voltage $V_{GS}$ turn on and off switch $Q_1$. PWM signal generator 100 is prompted by pulse-signal $V_2$ to control gate-source voltage $V_{GS}$ to a high level. Further, PWM signal generator 100 senses switch-current $I_Q$ via switch-voltage $V_Q$, the voltage drop across resistor $R_S$. In response, PWM signal generator 100 controls gate-source voltage $V_{GS}$ to a low level, when switch-voltage $V_Q$ corresponds to an output voltage of an output voltage controller (not shown).

Switching power supply 100 is a fly-back resonant power supply, because no current flows through secondary coil $N_S$, when switch $Q_1$ is turned on. This is because the voltage induced in secondary coil $N_S$ reverse-biases diode $D_2$. When switch $Q_1$ is turned on, primary coil $N_P$ is operated by input voltage $V_{IN}$ and energy is accumulated in transformer $T_1$. When switch $Q_1$ is turned off, secondary coil $N_S$ is reset by the output voltage $V_{OUT}$ and the energy stored in transformer $T_1$ is supplied to the load.

FIGS. 4A–H illustrate a method of operation of switching power supply 50.

Figure 4:
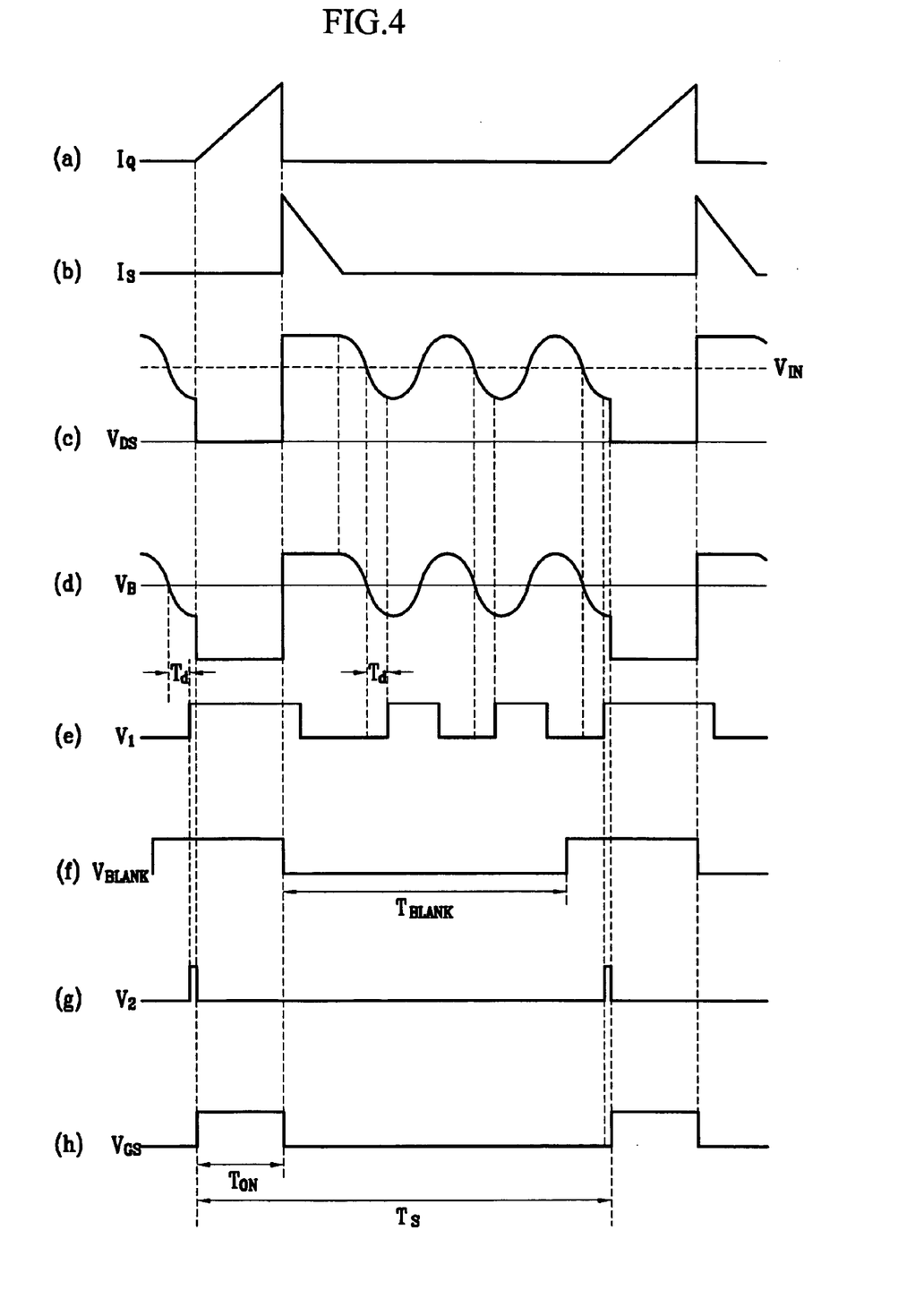
FIG. 4 shows waveforms at respective points of the switching power supply of FIG. 3.

FIG. 4H illustrates that switch $Q_1$ is turned on by PWM signal generator 100 applying a pulse signal of gate-source voltage $V_{GS}$ between the gate and source of switch $Q_1$, which exceeds a threshold voltage. The signal of gate-source voltage $V_{GS}$ is applied for an on-time $T_{ON}$ and repeated after a switching-period $T_S$.

FIG. 4A illustrates that input voltage $V_{IN}$ is applied to primary coil $N_P$ so that switch-current $I_Q$, flowing through switch $Q_1$, increases with a gradient of $V_{IN}/L_P$, where $L_P$ is the inductance of primary coil $N_P$.

FIG. 4B, together with FIG. 4H, illustrates that after an on-time $T_{ON}$, switch $Q_1$ is turned off. At this instance secondary current $I_S$, the current of the secondary circuit, jumps to a finite value and starts decreasing with a gradient of $-V_{OUT}/L_S$, where $L_S$ is inductance of secondary coil $N_S$. Secondary current $I_S$ reaches zero after a time interval. During this interval the energy accumulated in transformer $T_1$ is output from secondary coil $N_S$ and charges capacitor $C_3$.

In existing designs on-time $T_{ON}$ is determined by control-signal $V_{CTRL}$, an output-voltage control signal of an output voltage controller (not shown in FIG. 3). Switch $Q_1$ is turned off by PWM signal generator 100, when control-signal $V_{CTRL}$ corresponds to switch-voltage $V_Q$ at node 59, for example, by assuming the same value. Accordingly, on-time $T_{ON}$ increases, when control-signal $V_{CTRL}$ increases, and on-time $T_{ON}$ decreases, when control-signal $V_{CTRL}$ decreases. On-time $T_{ON}$ is determined by switch-voltage $V_Q$ at source-node 59, which is determined by switch-current $I_Q$. Now, switch-current $I_Q$ varies according to input voltage $V_{IN}$ since switch-current $I_Q$ increases with a gradient of $V_{IN}/L_P$. The gradient becomes steeper and on-time $T_{ON}$ is shortened, when input voltage $V_{IN}$ is large. Also, the gradient becomes gentler and on-time $T_{ON}$ is lengthened, when input voltage of $V_{IN}$ is less. On-time $T_{ON}$ contributes to the switching frequency of switch $Q_1$. Therefore, the switching frequency of switch $Q_1$ depends on input voltage $V_{IN}$. Similarly, on-time $T_{ON}$ is reduced, when the load decreases. For both of these reasons, the switching frequency depends on external conditions, the input voltage and the load. This aspect of existing designs can lead to problems.

Figure 5:
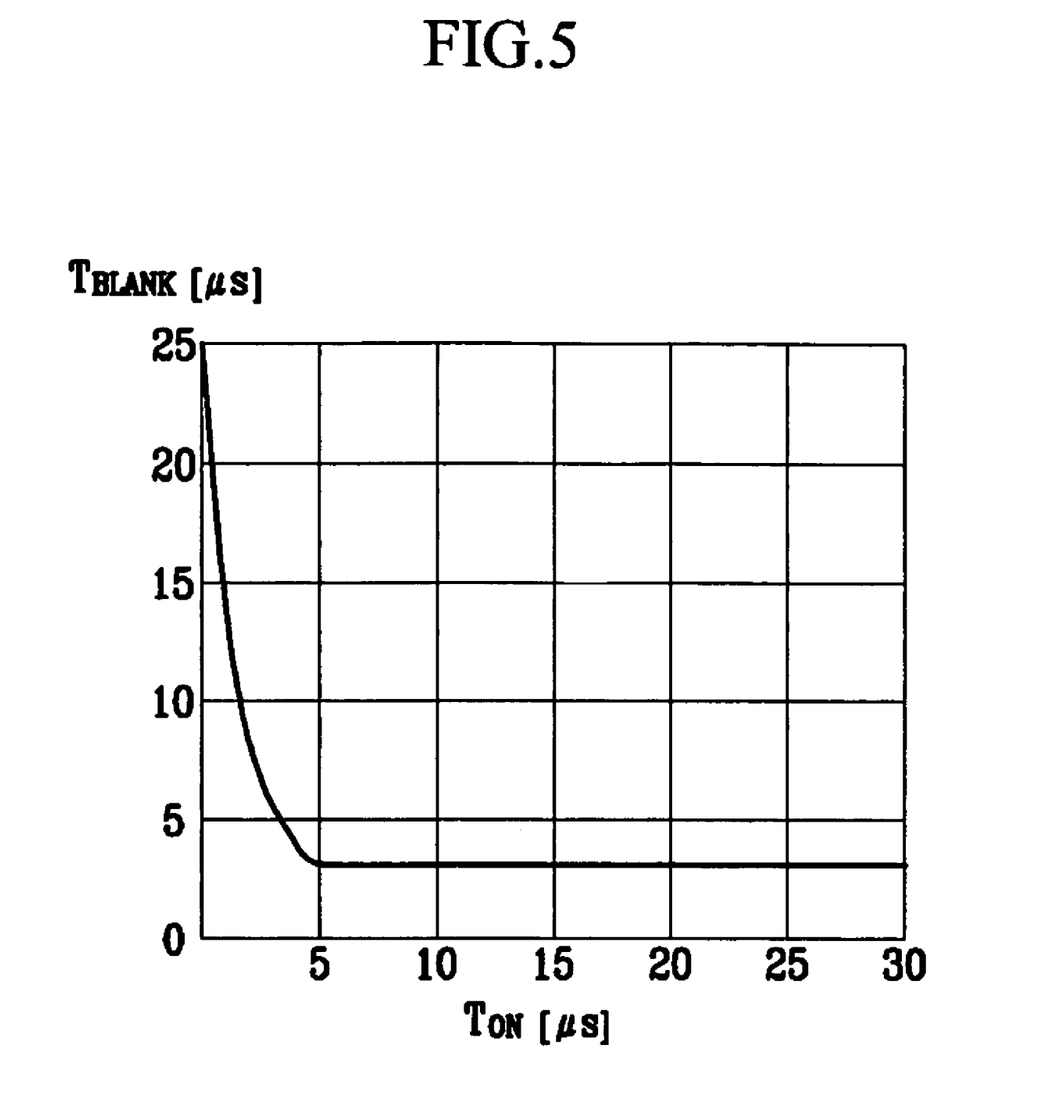
FIG. 5 shows a relation between on-time $T_{ON}$ and blank-time $T_{BLANK}$, according to an embodiment of the present invention.

FIG. 5 illustrates a control method, which addresses this problem, according to embodiments of the invention. In embodiments, Blanking Circuit 300 controls blank-time $T_{BLANK}$ according to on-time $T_{ON}$. If on-time $T_{ON}$ is reduced because, for example, input voltage $V_{IN}$ increases, in response blank-time $T_{BLANK}$ is extended so as to limit and possibly eliminate the increase of the switching frequency. An analogous extension of blank-time $T_{BLANK}$ is carried out, if a load reduction reduces on-time $T_{ON}$, once again reducing the increase of the switching frequency.

FIG. 4C illustrates that, when secondary current $I_S$ becomes zero, diode $D_2$ is turned off and secondary coil $N_S$ acquires a high impedance. From this time instance on, drain-source voltage $V_{DS}$ at primary coil $N_P$ follows a resonant cosine curve. The period of the resonant curve is determined by $L_P$, the inductance of primary coil $N_P$, and the capacitance of capacitor $C_R$. The resonating voltage is damped because of the influence of resistor $R_S$ (including a parasitic resistance component). Drain-source voltage $V_{DS}$ varies according to a cosine curve in the range between $V_{IN}+N \cdot V_{OUT}$ and $V_{IN}-N \cdot V_{OUT}$, where N is the ratio of winding numbers of primary coil $N_P$ and secondary coil $N_S$.

FIG. 4D illustrates that bias-coil voltage $V_B$ tracks drain-source voltage $V_{DS}$, shifted only by a constant. The shift is determined by the ratios of the winding numbers of primary coil $N_P$, secondary coil $N_S$, and bias coil $N_B$. Bias-coil voltage $V_B$ is input to ZCD 200. A function of ZCD 200 is to sense the time instance at which bias-coil voltage $V_B$ passes through zero.

FIG. 4E illustrates ZCD-signal $V_1$, which is output from ZCD 200 into Blanking Circuit 300. The onset of ZCD-signal $V_1$ is delayed by a delay-time $T_d$ relative to the time instance, when bias-coil voltage $V_B$ passes through zero. The delay operation can be performed by a delay circuit, which can be integrated into ZCD 200, or can be a separate circuit. In some embodiments, delay-time $T_d$ is chosen so that the onset of ZCD-signal $V_1$ essentially coincides with the time instance, when $V_{DS}$ reaches its minimum value.

FIG. 4F illustrates blank-signal $V_{BLANK}$, a voltage generated by Blanking Circuit 300. Blanking Circuit 300 receives ZCD-signal $V_1$ from ZCD 200, and the signal, representing $T_{ON}$, from PWM signal generator 100. From these input signals Blanking Circuit 300 generates blank-signal $V_{BLANK}$. Blank-signal $V_{BLANK}$ becomes low, when switch $Q_1$ is turned off, and it becomes high after blank-time $T_{BLANK}$. Blanking Circuit 300 generates blank-signal $V_{BLANK}$ by varying blank-time $T_{BLANK}$ according to on-time $T_{ON}$, or $V_{CTRL}/V_{IN}$ in order to restrict variations of the switching frequency. Blank-time $T_{BLANK}$ increases, when the signal representing $T_{ON}$ is reduced below a reference value, for example, because input voltage $V_{IN}$ increased. Blanking Circuit 300 generates short triggering pulses, when $V_{BLANK}$ is high and V1 goes from low to high. In an example, the reference value can be established such that on-time $T_{ON}$= 5 µs and blank-time $T_{BLANK}$=3µs This gives rise to a switching-period $T_S$ of 8 µs, resulting in a switching frequency restricted to values below $(1/T_S)$=125 kHz. The switching frequency is restricted by increasing blank-time $T_{BLANK}$, when on-time $T_{ON}$ is decreased.

FIG. 4G illustrates pulse-signal $V_2$, outputted by Blanking Circuit 300 into PWM signal generator 100. Pulse-signal $V_2$ includes a trigger-signal for turning on switch $Q_1$, when ZCD-signal $V_1$ and blank-signal $V_{BLANK}$ are high. Switch $Q_1$ is turned on, when the trigger-signal of pulse-signal $V_2$ is input into PWM signal generator 100. Also, when blank-signal $V_{BLANK}$ is low, Blanking Circuit 300 switches pulse-signal $V_2$ to a low level even when ZCD-signal $V_1$ is high.

FIG. 5 illustrates that in this embodiment, the switching frequency is restricted by varying blank-time $T_{BLANK}$ according to on-time $T_{ON}$. As discussed above, blank-time $T_{BLANK}$ is extended, when on-time $T_{ON}$ decreases, for example, because input voltage $V_{IN}$ increases. The present embodiment restricts such increases of the switching frequency.

FIGS. 4F and H illustrate that switching-period $T_S$ satisfies the equation: $T_S=T_{ON}+T_{BLANK}+\alpha$. As seen from this equation, the decrease of switching-period $T_S$ (i.e., the increase of the switching frequency) can be prevented by increasing blank-time $T_{BLANK}$, when on-time $T_{ON}$ is reduced. Here $\alpha$ is a time interval between the rising edge of blank voltage $V_{BLANK}$ and the rising edge of gate-source voltage $V_{GS}$. The value of $\alpha$ depends on ZCD-signal $V_1$ and is typically less than one resonant period. This operation was described in relation to FIG. 5.

Figure 6:
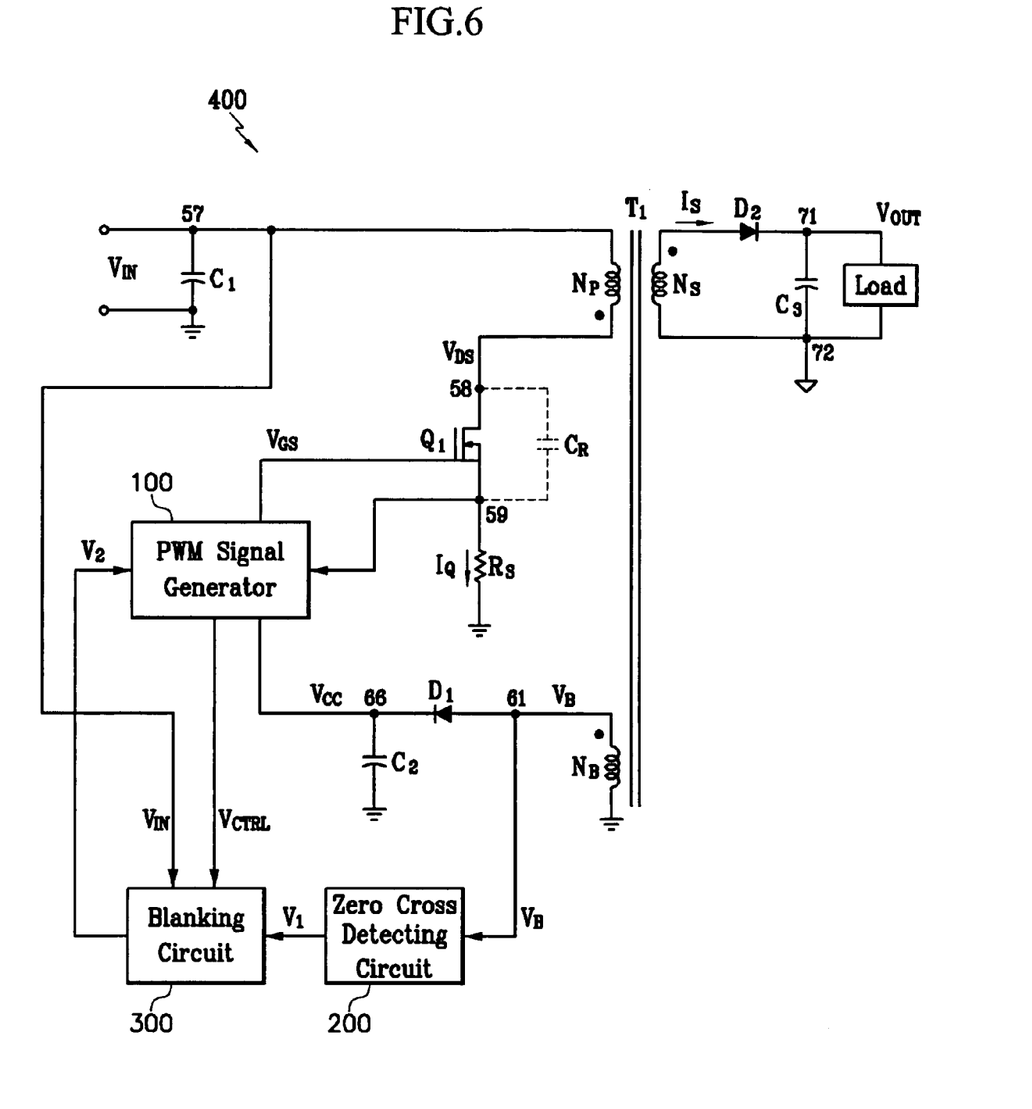
FIG. 6 shows a switching power supply according to an embodiment of the present invention.

FIG. 6 illustrates a switching power supply 400 according to an embodiment of the present invention. Switching power supply 400 is analogous to switching power supply 50, except that Blanking Circuit 300 is additionally coupled to input terminal 57. In this embodiment, Blanking Circuit 300 receives a control signal $V_{CTRL}$ from PWM signal generator 100 instead of the signal representing on-time $T_{ON}$. Further, Blanking Circuit 300 receives input voltage $V_{IN}$ from input terminal 57.

On-time $T_{ON}$ is proportional to control-signal $V_{CTRL}$ of an output voltage controller (not shown in FIGS. 3 and 6). On-time $T_{ON}$ increases, when control-signal $V_{CTRL}$ increases, and on-time $T_{ON}$ decreases, when control-signal $V_{CTRL}$ decreases. On-time $T_{ON}$ also decreases, when input voltage $V_{IN}$ increases, since switch-current $I_Q$ has a gradient of $V_{IN}/L_P$. Therefore, on-time $T_{ON}$ is in inverse relation to input voltage $V_{IN}$:

$$T_{ON} = k \frac{V_{CTRL}}{V_{IN}}, \quad (1)$$

where k is a constant. The switching frequency can be restricted by inputting control-signal $V_{CTRL}$ and input voltage $V_{IN}$ into Blanking Circuit 300, rather than the signal representing on-time $T_{ON}$. Blanking Circuit 300 uses control-signal $V_{CTRL}$ and input voltage $V_{IN}$ rather than the signal representing on-time $T_{ON}$, to generate blank-signal $V_{BLANK}$.

Figure 7:
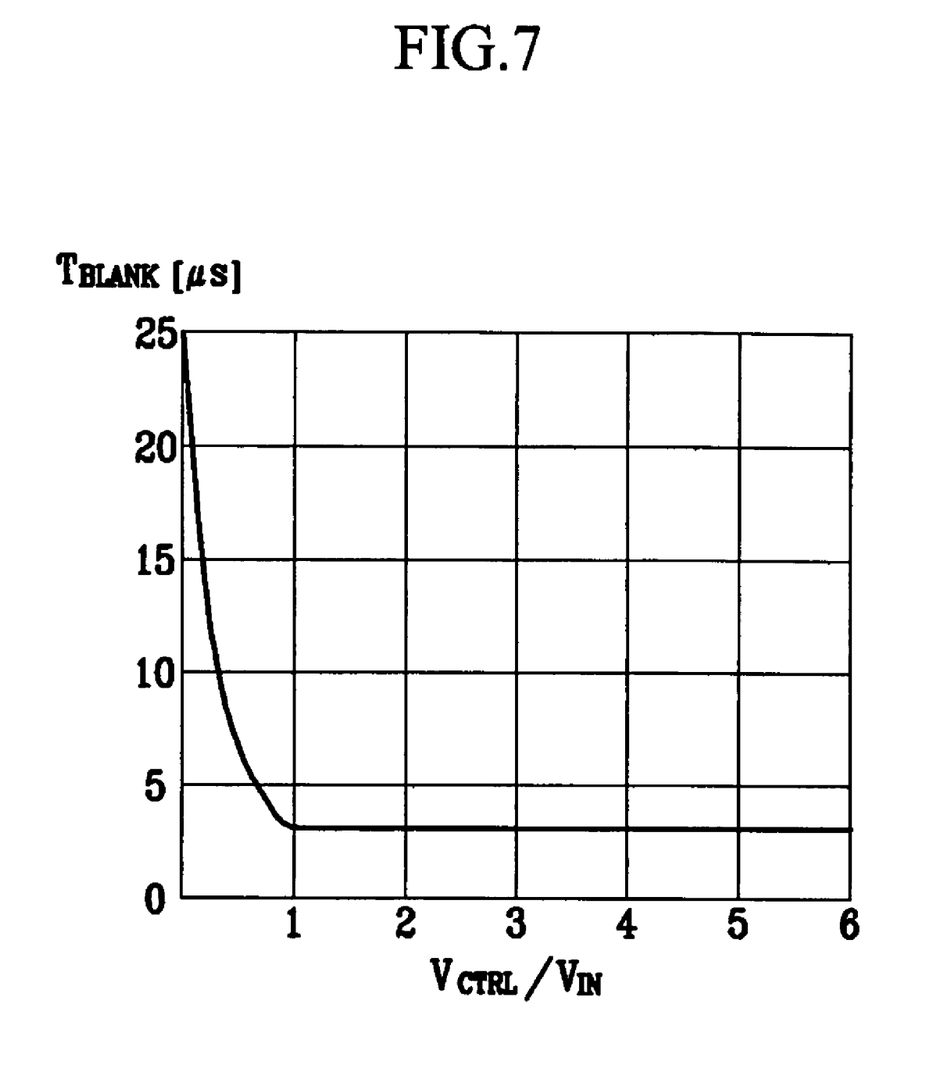
FIG. 7 shows a relation between on-time $T_{ON}$ and blank-time $T_{BLANK}$, according to an embodiment of the present invention.

FIG. 7 illustrates that a gradual increase of blank-time $T_{BLANK}$ is capable of restricting the switching frequency of switch $Q_1$, when the value of $V_{CTRL}/V_{IN}$ is reduced below a predetermined reference value. This ability to restrict the switching frequency is based on Equation 1. In detail, when input voltage $V_{IN}$ increases, the increase of the switching frequency of switch $Q_1$ is restricted by increasing blank-time $T_{BLANK}$. Also, the increase of the switching frequency of switch $Q_1$, caused by reduction of the load is restricted in a like manner. Switching power supply 400 has the same operation as that of switching power supply 50 except that input voltage $V_{IN}$ and control-signal $V_{CTRL}$ rather than the signal representing on-time $T_{ON}$ are input to Blanking Circuit 300.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching power supply, comprising:
   a switch, configured to switch a switch-voltage;
   a bias sensor, configured to sense the switch-voltage and to generate a bias-voltage representative thereof;
   a zero-crossing detector, coupled to the bias sensor, configured:
   to sense time instances when the bias-voltage crosses zero; and
   to generate a zero-crossing detector (ZCD)-signal, which transitions between a first and a second level at the sensed crossing instances, the transitions of the ZCD-signal being delayed for a predetermined time interval relative to the sensed crossings instances;
   a blanking circuit, coupled to the zero-crossing detector, the blanking circuit configured:
   to receive the ZCD-signal from the zero-crossing detector;
   to generate a blanking-signal, which transitions between a first and a second level; and
   to generate a pulse-signal, wherein the pulse-signal is capable of:
      causing the turning on of the switch, for an on-time, at time instances when the ZCD-signal and blanking-signal are at their respective second levels; and
      causing the turning off of the switch for at least a blank-time, wherein the length of the blank-time is determined according to the on-time; and
   a pulse width modulation (PWM) signal generator, coupled to the blanking circuit and to the switch, the PWM signal generator configured:
   to turn on the switch, controlled by the pulse-signal of the blanking circuit; and
   to transmit a signal representing the on-time to the blanking circuit.

2. The switching power supply of claim 1, wherein the blanking-signal transitions:
   from the second level to the first level, when the switch is turned off; and
   from the first level to the second level after the blank-time.

3. The switching power supply of claim 1, wherein the blank-time is chosen to keep the switching frequency of the switch below a predetermined frequency.

4. The switching power supply of claim 1, wherein the switch is one of a MOSFET and a bipolar junction transistor.

5. The switching power supply of claim 1, further comprising a capacitor coupled in parallel to the switch.

6. The switching power supply of claim 1, further comprising a resistor coupled between the switch and a ground, the pulse width modulation signal generator measuring the current, which flows from the resistor through the switch.

7. The switching power supply of claim 1, wherein the length of the blank-time increases as the on-time decreases.

8. The switching power supply of claim 1, wherein the length of the blank-time increases as the ratio of the control voltage and the input voltage decreases.

9. A switching power supply, comprising:
   a switch, configured to switch a switch-voltage;
   a bias sensor, configured to sense the switch-voltage and to generate a bias-voltage representative thereof;
   a zero-crossing detector, coupled to the bias sensor, configured:
   to sense time instances when the bias-voltage crosses zero; and
   to generate a zero-crossing detector (ZCD)-signal, which transitions between a first and a second level at the sensed crossing instances, the transitions of the ZCD-signal being delayed for a predetermined time interval relative to the sensed crossings instances;
   a blanking circuit, coupled to the zero-crossing detector, the blanking circuit configured:
   to receive the ZCD-signal from the zero-crossing detector;
   to generate a blanking-signal, which transitions between a first and a second level; and
   to generate a pulse-signal, wherein the pulse signal is capable of:
      causing the turning on of the switch, for an on-time, at time instances when the ZCD-signal and blanking-signal are at their respective second levels; and
      causing the turning off of the switch for at least a blank-time, wherein the length of the blank-time is determined according to an input voltage and an control voltage; and
   a pulse width modulation (PWM) signal generator, including a control circuit, the PWM signal modulator coupled to the blanking circuit and to the switch, the PWM signal generator configured:
   to turn on the switch, controlled by the pulse-signal of the blanking circuit; and
   to transmit a signal representing a control voltage of the control circuit to the blanking circuit.

10. The switching power supply of claim 9, wherein the blank-time is chosen to keep the switching frequency of the switch below a predetermined frequency.

11. A switching power supply for controlling a time for turning on/off a switch and generating a first output voltage from an input voltage, the switching power supply comprising:
   a transformer, including a primary coil, a secondary coil, and a bias coil, the transformer configured to store energy in the primary coil, when the switch is turned on and transferring the energy stored in the primary coil to the secondary coil, when the switch is turned off;
   a bias sensor, configured to sense a switch-voltage of the switch and to generate a bias-voltage representative thereof;

a zero-crossing detector, coupled to the bias sensor, configured:
to sense time instances when the bias-voltage crosses zero; and
to generate a zero-crossing detector (ZCD)-signal, which transitions between a first and a second level at the sensed crossing instances, the transitions of the ZCD-signal being delayed for a predetermined time interval relative to the sensed crossings instances;
a blanking circuit, coupled to the zero-crossing detector, the blanking circuit configured:
to receive the ZCD-signal from the zero-crossing detector;
to generate a blanking-signal, which transitions between a first and a second level; and
to generate a pulse-signal, wherein the pulse signal is capable of:
causing the turning on of the switch, for an on-time, at time instances when the ZCD-signal and blanking-signal are at their respective second levels; and
causing the turning off of the switch for at least a blank-time, wherein the length of the blank-time is determined according to the on-time; and
a pulse width modulation (PWM) signal generator, coupled to the blanking circuit and to the switch, the PWM signal generator configured:
to turn on the switch, controlled by the pulse-signal of the blanking circuit; and
to transmit a signal representing the on-time to the blanking circuit.

12. The switching power supply of claim 11, wherein the blank-time is chosen according to the on-time of the switch.

13. The switching power supply of claim 11, further comprising a capacitor coupled in parallel to the switch and forming a resonant circuit with the primary coil.

14. The switching power supply of claim 11, further comprising a diode and a capacitor being coupled between the secondary coil and a load and smoothing a voltage induced in the secondary coil.

15. The switching power supply of claim 11, wherein the blank-time is chosen to keep a switching frequency of the switch below a predetermined frequency.

16. The switching power supply of claim 11, wherein the blank-time is chosen according to a control-voltage and an input voltage.

17. The switching power supply of claim 16, wherein the blank-time is chosen to keep a ratio between the control-voltage and the input voltage below a predetermined value.

18. The switching power supply of claim 16, wherein the blank-time is chosen to keep a switching frequency of the switch below a predetermined frequency.

19. The switching power supply of claim 11, wherein the blank-signal transitions from the second level to the first level, when the switch is turned off, and the blank-signal transitions from the first level to the second level after the blank time.

20. The switching power supply of claim 11, wherein the switch is one of a MOSFET and a bipolar junction transistor.

21. The switching power supply of claim 11, wherein the length of the blank-time increases as the on-time decreases.

22. A power supply method for controlling a time for turning on/off a switch and generating an output voltage from an input voltage, the method comprising:
(a) sensing time instances, when a bias-voltage, related to the state of the switch, crosses zero;
(b) generating a zero-crossing detection (ZCD) signal, the ZCD signal transitioning between a first and a second level at the sensed zero-crossing instances, the transitions being delayed by a predetermined interval;
(c) generating a blank-signal, having a first and a second levels, the blank-signal assuming the first level for a blank-time, the length of the blank-time being variable;
(d) generating a pulse-signal, capable of causing the turning on of the switch at time instances when the ZCD signal and the blank-signal are at their respective second level; and
(e) turning on the switch by the pulse-signal.

23. The power supply method of claim 22, wherein the blank-time is chosen according to an on-time of the switch.

24. The power supply method of claim 22, wherein the blank-time is chosen according to a control-voltage and the input voltage.

25. The power supply method of claim 22, wherein the length of the blank-time increases as the on-time decreases.

26. The power supply method of claim 22, wherein the length of the blank-time increases as the ratio of the control voltage and the input voltage decreases.

* * * * *